United States Patent [19]

Ogusu et al.

[11] Patent Number: 5,590,100
[45] Date of Patent: Dec. 31, 1996

[54] INFORMATION RECORDING/REPRODUCING TECHNIQUE TO RECORD PLURAL-CHANNEL INFORMATION FOR SUBSEQUENT SIMULTANEOUS REPRODUCTION

[75] Inventors: Mikio Ogusu; Kazunobu Fujiwara, both of Hamamatsu, Japan

[73] Assignee: Yamaha Corporation, Hamamatsu, Japan

[21] Appl. No.: 444,844

[22] Filed: May 17, 1995

[30] Foreign Application Priority Data

Jun. 3, 1994 [JP] Japan .................................. 6-145548

[51] Int. Cl.$^6$ ........................................................ G11B 7/00
[52] U.S. Cl. ............................... 369/32; 369/48; 369/50; 369/128; 369/64; 369/124; 369/58
[58] Field of Search ...................................... 369/54, 44.33, 369/47, 116, 44.31, 44.38, 32, 48, 50, 128, 64, 124, 58

[56] References Cited

U.S. PATENT DOCUMENTS 5,012,461 4/1991 Yoshida et al. ..................... 369/44.33

5,224,087 6/1993 Maeda et al. .............................. 369/54

FOREIGN PATENT DOCUMENTS

4-40655 2/1992 Japan .

*Primary Examiner*—Viet Q. Nguyen
*Attorney, Agent, or Firm*—Loeb & Loeb LLP

[57] ABSTRACT

Program information of plural channels is recorded on an optical magnetic disk in such a manner that the program information can be simultaneously reproduced together from the disk. Once other program information is overwritten on part of any of the recording channels of the disk that has become unnecessary, a UTOC generation/UTOC recording/UTOC memory controlling section generates UTOC information that designates the overwritten section as a position to be reproduced and a section other than the overwritten section as a position to be silenced or muted, and records the generated UTOC information onto the UTOC area of the optical magnetic disk. As reproduction from the optical magnetic disk is performed, the UTOC information is read out so that reproduction signal is output at the position to be reproduced, and silence signal is output at the position to be silenced.

23 Claims, 9 Drawing Sheets

| LEAD-IN | UTOC | 1 | | | | ←TRACK No. | LEAD-OUT |
|---|---|---|---|---|---|---|---|

Address markers: A  BC  DE  FG  HI  J ←ADDRESS

| TRACK No. | ADDRESS |
|---|---|
| 1 | A  J |
|  |  |
|  |  |

(2)

| LEAD-IN | UTOC | 1 | 2 | 3 | 4 | 5 | ←TRACK No. | LEAD-OUT |
|---|---|---|---|---|---|---|---|---|

Address markers: A  BC  DE  FG  HI  J ←ADDRESS

| TRACK No. | ADDRESS |
|---|---|
| 1 | A  B |
| 2 | C  D |
| 3 | E  F |
| 4 | G  H |
| 5 | I  J |

(3)

| LEAD-IN | UTOC | 1 | | 2 | | 3 | ←TRACK No. | LEAD-OUT |
|---|---|---|---|---|---|---|---|---|

Address markers: A  BC  DE  FG  HI  J ←ADDRESS

| TRACK No. | ADDRESS |
|---|---|
| 1 | A  B |
| 2 → | C  D →AVAILABLE |
| 3 → 2 | E  F |
| 4 → | G  H →AVAILABLE |
| 5 → 3 | I  J |

(4)

| LEAD-IN | UTOC | 1 | | 1 | | 1 | ←TRACK No. | LEAD-OUT |
|---|---|---|---|---|---|---|---|---|

Address markers: A  BC  DE  FG  HI  J ←ADDRESS

| TRACK No. | ADDRESS |
|---|---|
| 1 | A  B |
| 1 | E  F |
| 1 | I  J |

FIG. 11C (a) CHANNEL CH1

| START ADDRESS | STOP ADDRESS |
|---|---|
| A | B |
| C | D |
| E | F |
|   |   |
|   |   |
|   |   |

(b) CHANNEL CH2

| START ADDRESS | STOP ADDRESS |
|---|---|
| (A) | (F) |
|   |   |
|   |   |
|   |   |
|   |   |
|   |   |

(c) CHANNEL CH3

| START ADDRESS | STOP ADDRESS |
|---|---|
|   |   |
|   |   |
|   |   |
|   |   |
|   |   |
|   |   |

FIG. 12

INFORMATION RECORDING/REPRODUCING TECHNIQUE TO RECORD PLURAL-CHANNEL INFORMATION FOR SUBSEQUENT SIMULTANEOUS REPRODUCTION

BACKGROUND OF THE INVENTION

The present invention relates generally to a recording device and a recording medium for use in recording program information of plural channels in such a manner that the program information can subsequently be simultaneously reproduced together, and a reproducing device for simultaneously reproducing the plural-channel program information from the recording medium. More particularly, the present invention relates to an improved recording and reproducing technique which can effectively simplify the necessary operations for overwriting new program information on selected section of a recording channel of a recording medium which has become no longer necessary.

The multi-channel recording (multiplex recording), usually employed in applications where the number of parts (the number of types of musical instrument sound or the like) to be recorded is greater than the number of recording channels of a recorder used, has been heretofore performed for example by a repetition of the so-called "ping-pong recording" operation. Ping-pong recording generally comprises the steps of first recording some of plural desired parts separately on individual recording channels, then reproducing the thus recorded parts to be re-recorded together (mixed) onto a single empty channel (this is called "ping-pong recording"), and thence overwriting other or new parts separately onto the individual recording channels that have now become unnecessary due to the ping-pong recording (i.e., newly writing the other parts on top of the previously recorded information on the now-unnecessary recording channels so that the previous information is no longer left on the channels).

Figure 2:
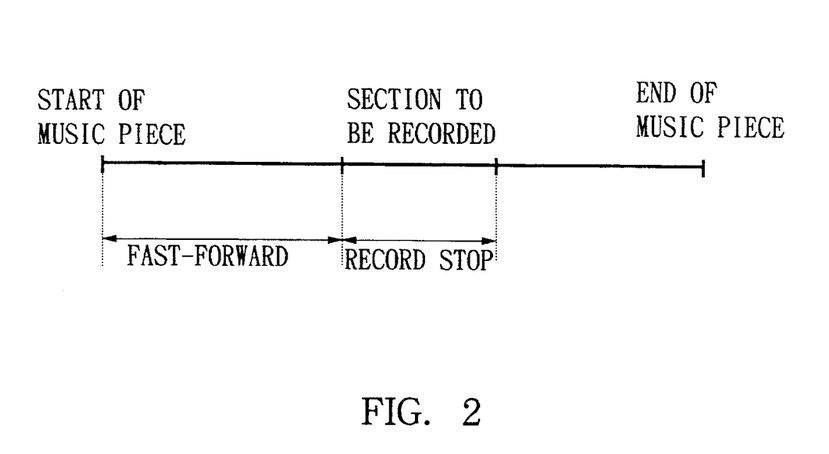
Figure 3:
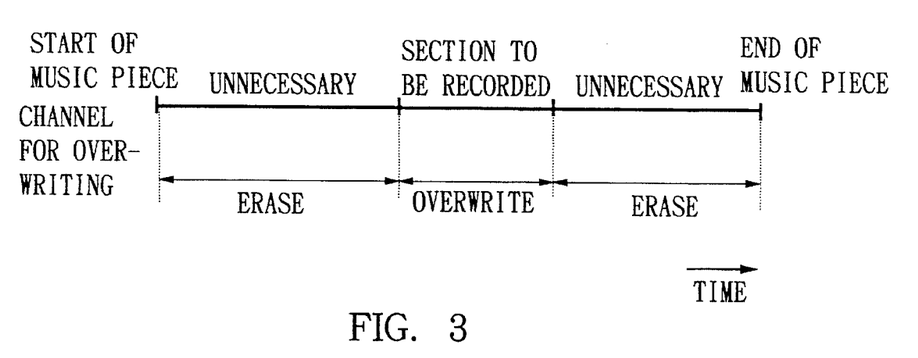
FIG. 3 is a diagram explanatory of an overwrite operation performed via the conventional multi-track recorder of FIG. 2.
Figure 4:
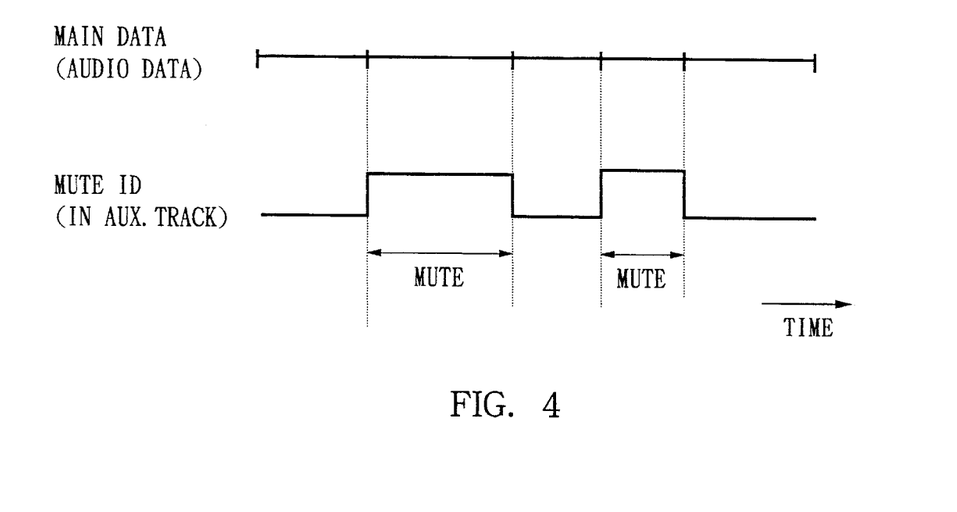
FIG. 4 is a diagram explanatory of an overwrite operation performed via a conventional multi-track recorder employing a DCC recorder, etc.

However, in order to overwrite the other parts onto any of the now-unnecessary recording channels in the above-noted manner, the prior art multi-track recorders employing a compact cassette or the like, even when the part to be over-written has a very small number of measures, would require a considerable time, corresponding to the full length (from start to end) of a music piece previously recorded on the recording channel. Namely, if the whole of the recording channel to be used for over-writing has no music piece recorded thereon, it is possible to merely fast-forward the tape to access the start point of a necessary section and then record only on that section, as schematically illustrated in FIG. 2. On the other hand, in the case of a recording channel having any music piece recorded thereon, it is necessary to perform recording while erasing every unnecessary section of the music piece (in other words, recording "silence" on the unnecessary section) as seen from FIG. 3, which would eventually require a considerably long time, corresponding to the full length of the previously recorded music piece.

Further, with the conventional DCC (Digital Compact Cassette) recorders, in order to overwrite a new music piece top of part of a previously recorded music piece, it has been customary to, instead of erasing every unnecessary section, record "mute ID" codes on an auxiliary track of the unnecessary section. This approach would also require a long time, corresponding to the full length of the previously recorded music piece.

Figure 5:
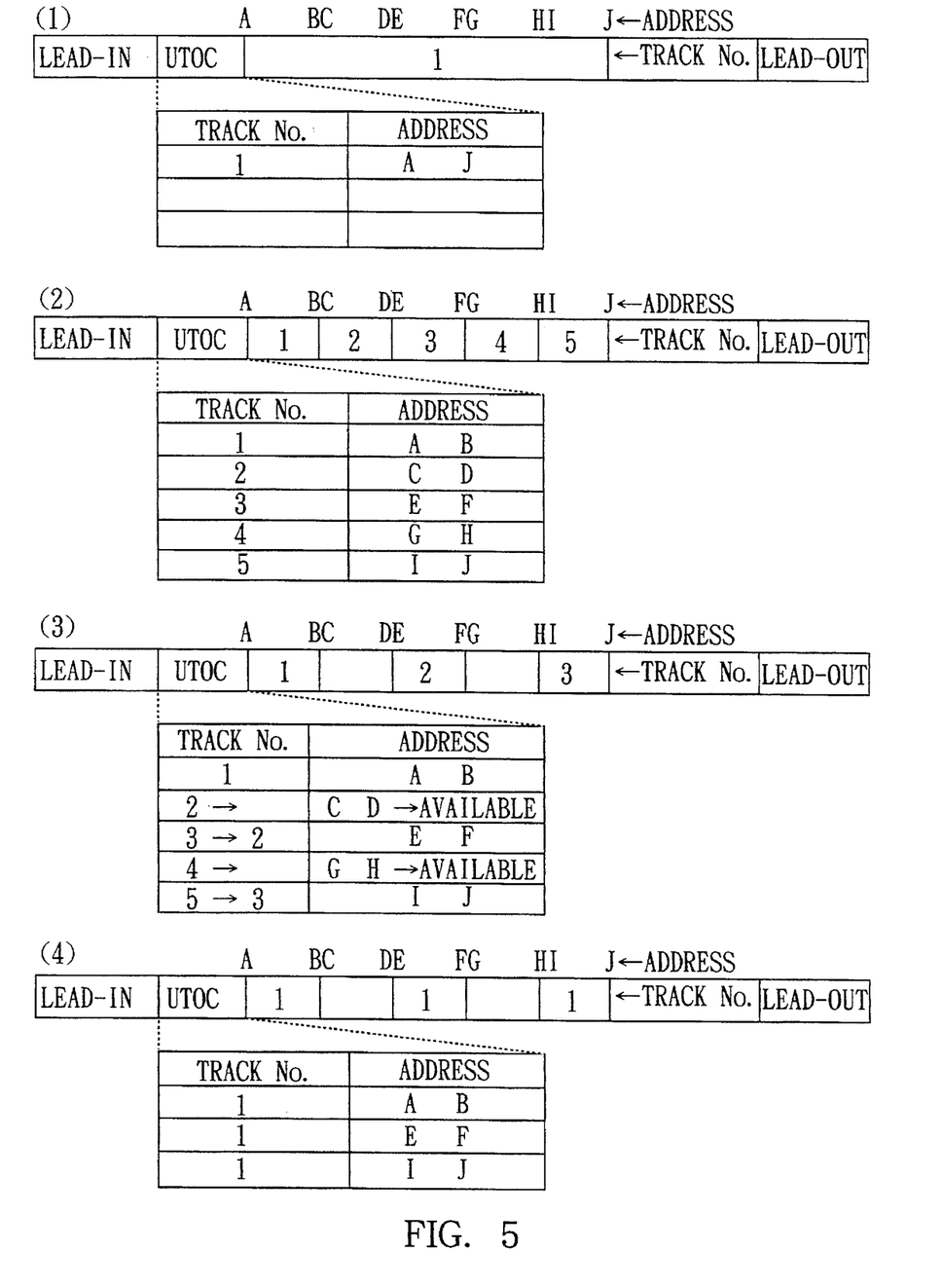
FIG. 5 is a diagram explanatory of an overwrite operation performed via a conventional MD recorder.

Furthermore, with the conventional MD (Mini Disk) recorders, a "UTOC" (Users' Table of Contents) is provided to manage recorded information in terms of track numbers (music pieces). Hence, the UTOC can use its editing function to treat every selected section of a desired track (music piece) as if it were actually erased to thereby save the time and labor needed for erasing the unnecessary section or adding mute ID codes to the entire unnecessary section. But, it would present a significant problem that both the right and left channels of the selected section are treated uniformly as erased, with the result that the section thus treated is completely skipped during next reproduction (and hence the edited music piece is reproduced with undesirable loss or break in its time continuity). An example sequence of such a UTOC editing operation will be described as follows with reference to FIG. 5:

(1) Information about a certain music piece is recorded over addresses A to J (it is assumed in this example that information only at addresses C–D and G–H is to be erased);

(2) To achieve the erasure, the music piece recorded over addresses A–J is divided into five music piece sections, and the UTOC is edited in correspondence to the music piece division;

(3) Then, the UTOC is edited so as to treat, as sections to be erased, the second and fourth music piece sections corresponding to addresses C–D and G–H; and (4) Finally, the UTOC is edited to combine the information at addresses A–B, E–F and I–J again into a single music piece. After such editing of the UTOC, the music piece is reproduced from addresses A–B, to E–F and to I–J with the sections of addresses C–D and G–H skipped.

SUMMARY OF THE INVENTION

It is therefore an object of the present invention to provide an improved recording and reproducing technique, applied as a recording device and a recording medium for use in recording plural-channel program information in such a manner that the program information can subsequently be simultaneously reproduced together. The recording and reproducing technique is also applied as a reproducing device for permitting simultaneous reproduction of the plural-channel program information from the recording medium, the reproducing device, in overwriting new program information on a recording channel with no longer necessary information recorded thereon, permits selective erasure of every unnecessary section of the recording channel without the need to actually erase the unnecessary section or to add mute ID codes to the entire unnecessary section. The reproducing device also allows recorded information of the other recording channel to be reproduced with no skipping, to thereby effectively simplify the necessary operations for the overwriting.

In order to accomplish the above-mentioned object, the present invention provides a recording device which comprises a recording section for recording program information of plural channels onto a recording medium in such a manner that the program information of the plural channels can be simultaneously reproduced from the recording medium, and a reproduction information generation section for, with respect to the program information recorded on the recording medium, generating reproduction information The reproduction information consists of either information indicating each position to be reproduced, or information indicating each position to be silenced or both.

The present invention also provides a reproducing device which comprises a program reproduction control section for simultaneously reproducing program information of plural channels recorded on a recording medium, and a reproduction information storage section for storing reproduction information for each of the channels of the recording medium. The program reproduction control section performs control to reproduce or silence the program information for each channel, on the basis of the reproduction information stored in the reproduction information storage section.

Further, the present invention provides a recording medium which has program information of plural channels recorded thereon in such a manner that the program information of plural channels can be simultaneously reproduced therefrom, and in which reproduction information for each of the channels is recorded on a predetermined recording position of the medium. According to the recording device constructed in the above-mentioned manner, because reproduction information is generated for each channel of the program information recorded on the recording medium, the necessary sections can be reproduced, and the unnecessary sections can be silenced in an efficient, selective fashion by a given reproducing device using such generated reproduction information. This eliminates the need for the recording device to erase the unnecessary sections present on the medium or to add mute ID codes to entire unnecessary sections, and substantially reduces the necessary time and labor for overwriting.

A preferred embodiment of the recording device may be designed in such a manner that a specific section designated by information indicating recording start and recording end positions is identified when new recording is performed with respect to any of the channels A reproduction information designating this specific section as a section of the channel to be reproduced is then generated, and a reproduction information designation a section other than the specific section as a section to be silenced is generated This arrangement permits automatic generation of reproduction information indicating positions to be reproduced and silenced in accordance with the recording start and end operations, thus providing highly improved utility of the recording device.

Another preferred embodiment of the that reproduction information is recorded onto a predetermined position on the recording medium. Thus, the use of a given reproducing device capable of decoding such information allows the necessary sections to be reproduced, and the unnecessary sections to be silenced in an efficient, selective fashion for each of the channels.

According to the reproducing device constructed in the above-mentioned manner, reproduction information for each of the channels is stored, and control is performed to reproduce or silence the program information for each channel on the basis of the thus stored reproduction information. The use of such a reproducing medium with unnecessary section left unerased allows the necessary sections to be reproduced, and the unnecessary sections to be silenced in a reliable, selective fashion for each of the channels.

A preferred embodiment of the reproducing device may be designed in such a manner that the reproduction information recorded on a predetermined position of the recording medium is read out for storage. Thus, the necessary sections can be reproduced, and the unnecessary sections can be silenced in a reliable, selective fashion for each channel by use of the reproduction information recorded on the recording medium.

According to the recording medium, because program information of plural channels are recorded in such a manner that it can be simultaneously reproduced therefrom, and reproduction information is recorded on a predetermined position on the medium, the necessary sections, can be reproduced, and the unnecessary sections can be silenced in an efficient, selective manner for each channel by reading this reproduction information via a given reproducing device.

Now, the preferred,embodiment of the present invention will be described in detail below with reference to the accompanying drawings.

BRIEF DESCRIPTION OF THE DRAWINGS

In the accompanying drawings:

FIG. 2 is a diagram explanatory of a new write operation performed via a conventional multi-track recorder employing a compact cassette or the like;

DETAILED DESCRIPTION OF THE PREFERRED EMBODIMENTS

A description will now be made on the assumption that the present invention is applied to an optical magnetic disk (for example, MD: Mini Disk) system. For purposes of description, it is also assumed here that predetermined information indicating serial positions on the disk is previously recorded on grooves pre-formed therein (pre-grooves), as absolute position information in the form of address or time information, and that three channels (CH1, CH2 and CH3) are available for recording program information. It should be understood that, throughout this specification, the terms "mute" and "muted" are used interchangeably with the terms "silence" and "silenced", respectively.

Figure 6:
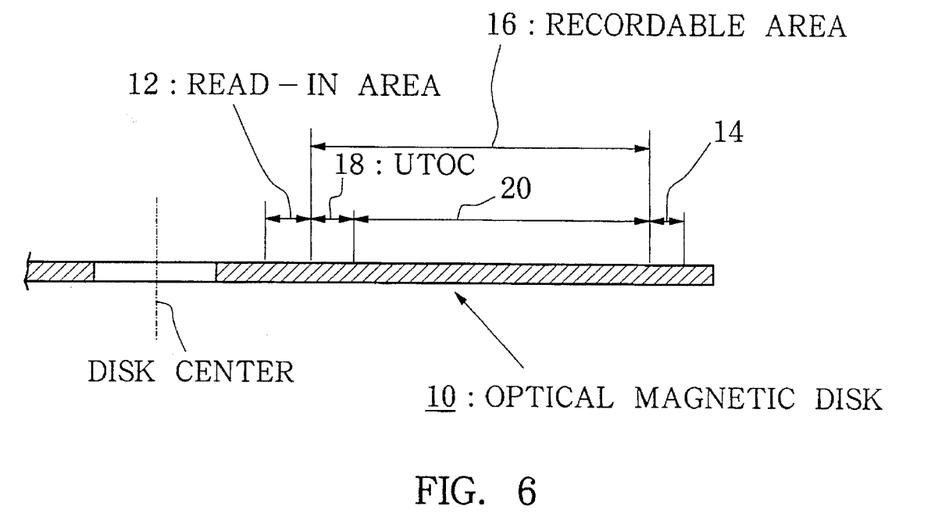
FIG. 6 is a sectional view showing the disk format of the optical magnetic disk in accordance with the embodiment of FIG. 1.

In FIG. 6, there is shown an example disk format of this optical disk, in which a lead-in area is disposed along the inner-most circumference of the disk, and a lead-out area 14 is disposed along the outer-most circumference of the disk. Between the lead-in and lead-out areas is provided a recordable area 16 available for recording by the user. In the inner-most region of the recordable area 16, there is provided an UTOC (User's Table of Contents) area 18 for recording table-of contents information, where it is recorded, for each channel, reproduction information, constitutes the most significant feature of the present invention. As will be later described in detail, the reproduction information comprises either information indicating each position to be reproduced, or information indicating each position to be muted, or both. Along the outer circumferential part of the UTOC area is a program area 20 for recording program information (in this embodiment, sound information) of plural channels.

Figure 7:
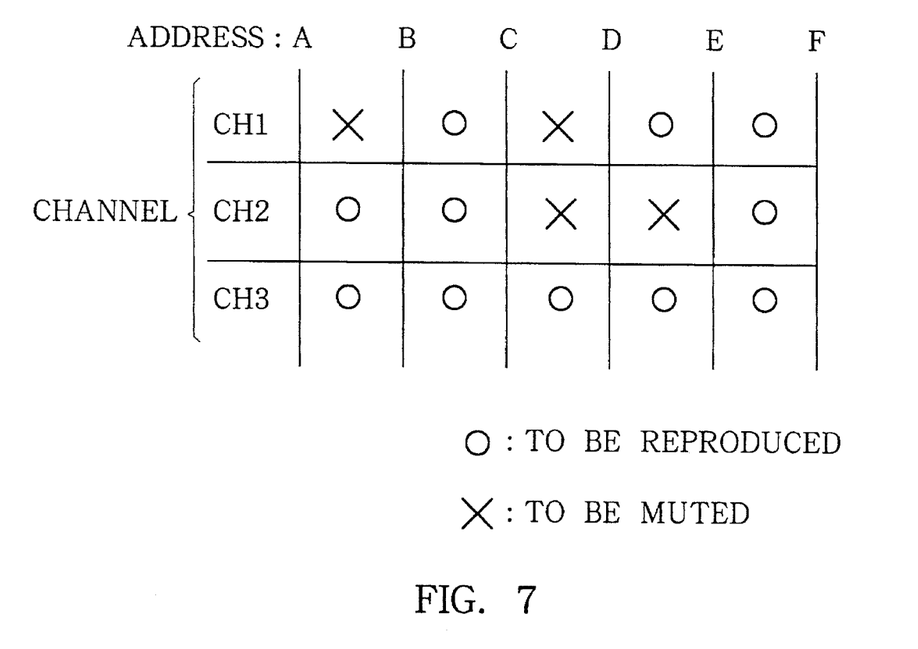
FIG. 7 shows example of the setting states of positions to be reproduced and to be muted which are determined for each channel in the embodiment of FIG. 1.

The reproduction information recorded on the UTOC area 18, as typically illustrated in FIG. 7, specifies, for each of the channel individual positions where sound is to be reproduced and where no sound is to be reproduced. For this purpose, this reproduction information may be comprised of either information indicating each position to be reproduced, or information indicating each position to be muted, or both. In the case where the reproduction information is comprised solely of the information indicating each position to be reproduced, the example of FIG. 7 will specify as shown in Table 1 below:

Table 1

CH1 : Sections B–C and D–F to be reproduced

CH2 : Sections A–C and E–F to be reproduced

CH3 : Section A–F to be reproduced

In this example, for each of the channels CH1 to CH3, the reproducing device performs control to reproduce sound of each section designated by the reproduction information and set, as a silent or muting section, each section not designated by the reproduction information.

Conversely, in the case where the reproduction information is comprised solely of the information indicating each position to be muted, the example of FIG. 7 will specify as shown in Table 2 below:

Table 2

CH1 : Sections A–B and C–D to be muted

CH2 : Section C–E to be muted

In this example, the reproducing device performs control to set, as a muted section, each section designated by the reproduction information and to reproduce sound of each section not designated by the reproduction information.

Further, in the case where the reproduction information is comprised of both the information indicating each position to be reproduced and the information indicating each position to be muted, the example of FIG. 7 will specify as shown by the combination of Tables 1 and 2 above.

Figure 8:
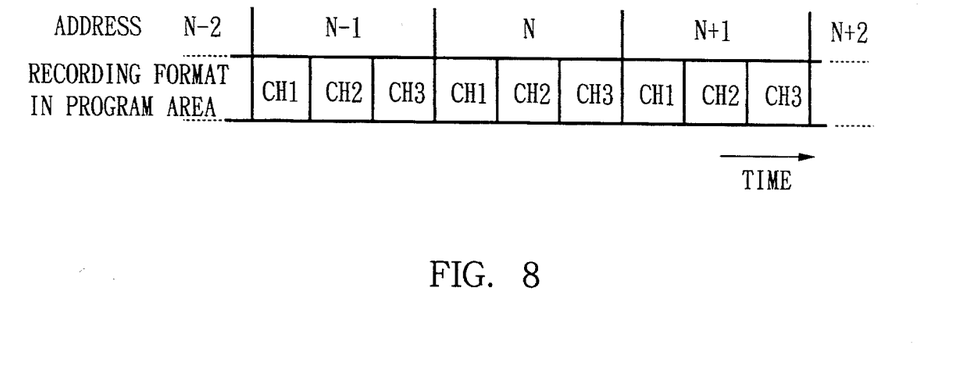
FIG. 8 is a view showing the recording format of a program area of the optical magnetic disk in accordance with the embodiment of FIG. 1.

The recording format of the program information on the program area 20 is arranged in such a manner as to time-divisionally record the program information of channels CH1 to CH3, as shown by way of example in FIG. 8.

Figure 9:
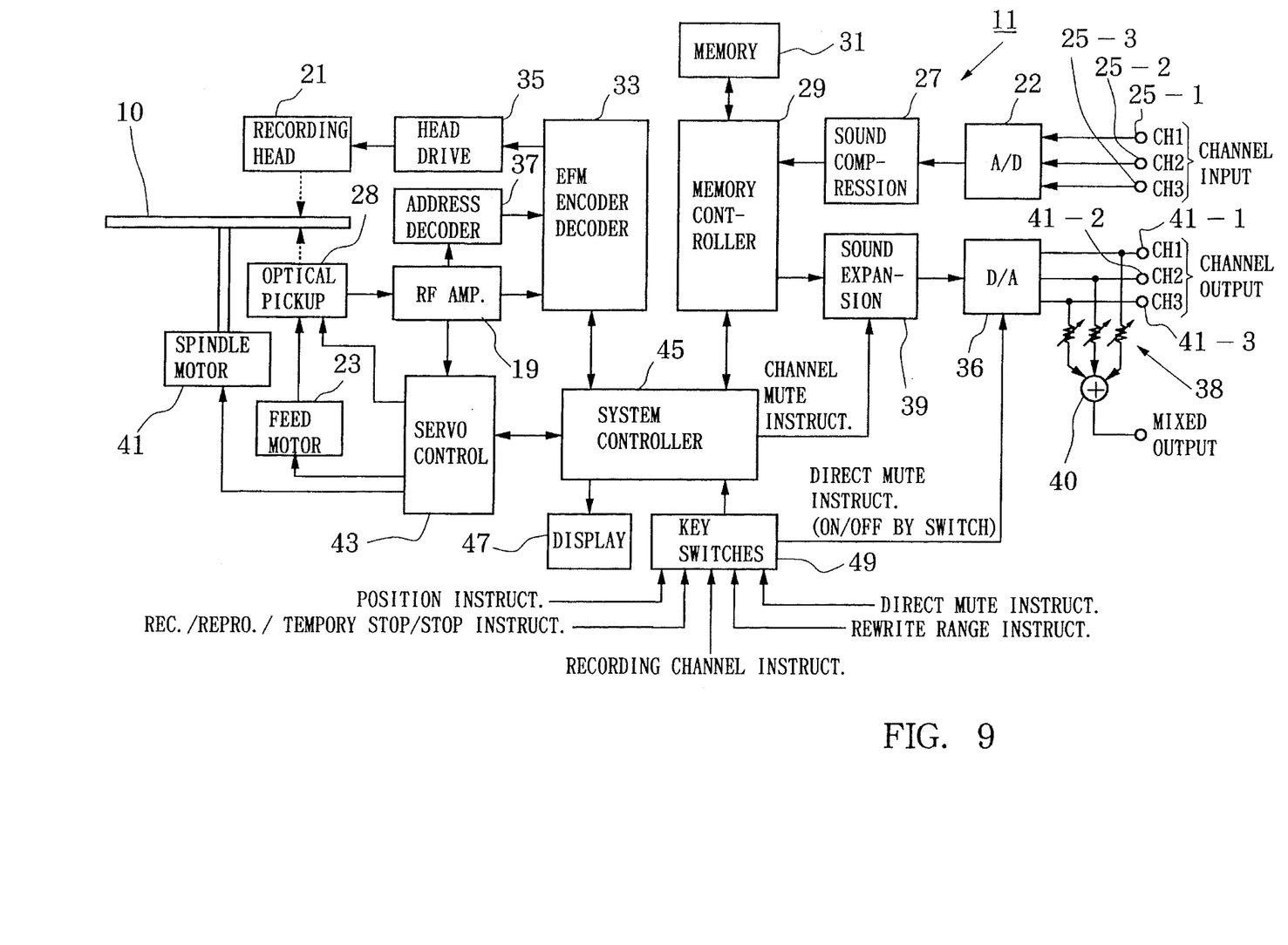
FIG. 9 is a system diagram showing an embodiment where the present invention is applied to an optical magnetic disk system.

FIG. 9 illustrates the system construction of the optical magnetic disk recording reproducing device, which is employed for recording and reproducing to and from the optical magnetic disk 10, that is constructed in the above-mentioned manner. The optical magnetic disk 10 is driven to rotate via a spindle motor 41. Recording head (magnetic head) 21 and optical pickup 28 are disposed above and below the optical magnetic disk 10, respectively, in opposed relation to each other. The recording head 21 and optical pickup 28 are mechanically interconnected and are movable together along the radius of the disk 10 by means of a transfer motor.

In recording, input signal for each channel CH1 to CH3, introduced via a corresponding channel input terminal 25-1 to 25-3, is converted into digital form by an A/D converter 22 and then compressed by a sound compression section 27. The compressed signal from the sound compression section 27 is temporarily stored via a memory controller 29 in a memory (shock-proof or buffer memory) 31 and is then read out therefrom to be subjected to EFM (Eight-to-fourteen Modulation) processing via an EFM encoder/decoder 33. Head drive section 35 modulates head drive signal with EFM signal to drive the recording head 21. The optical pickup 28 irradiates a recording laser beam of predetermined power onto the recording surface of the disk 10, which is opposite to the recording head 21, to thereby effect recording based on magnetic field modulation.

In reproduction, RF signal (disk detection signal) output from the optical pickup 28 is amplified via an RF amplifier 19 and then EFM demodulated by the EFM encoder/decoder 33. The thus-demodulated program signal is temporarily stored via the memory controller 29 in the memory 31 and is then read out for expansion by a sound expansion section 39. The expanded signal output from the expansion section 39 is converted by a D/A converter 36 into analog form for each channel CH1 to CH3 and is output via a corresponding channel output terminal 41-1 to 41-3. Also, the respective channel output signals are passed through an attenuator 38 to be mixed together by a mixer 40, and the mixed signal is output via an output terminal 43.

The position (address) information, which is, as earlier noted, previously recorded on the pre-grooves in the optical magnetic disk 10, is decoded via an address decoder 37 for occasional reference by a system controller 45. The servo-control section 43, by use of the disk detection signal, controls the focusing, tracking and movement of the optical pickup 28 as well as the rotation the spindle motor 41. The rotation control of the spindle motor 41 is performed in such a manner that wobble signal can be detected at a predetermined frequency.

During recordation and reproduction, the system controller 45 controls the entire operation of the optical disk recording/reproducing device 11. A display section 47 displays a position, music piece number or the like to be recorded or reproduced. In response to the user's activation, a key switch 49 outputs a recording/reproducing position instruction, recording/reproduction/temporary stop/stop instruction, recording channel instruction, rewrite range instruction, direct mute instruction or the like. The recording channel instruction indicates any of the channels CH1 to CH3 to be used for recording. The rewrite range instruction indicates a range in the entire program area to be rewritten. The direct mute instruction instructs muting of the output for each channel so as to allow the output of a selected channel to be directly turned ON or OFF without using the UTOC information.

Figure 1:
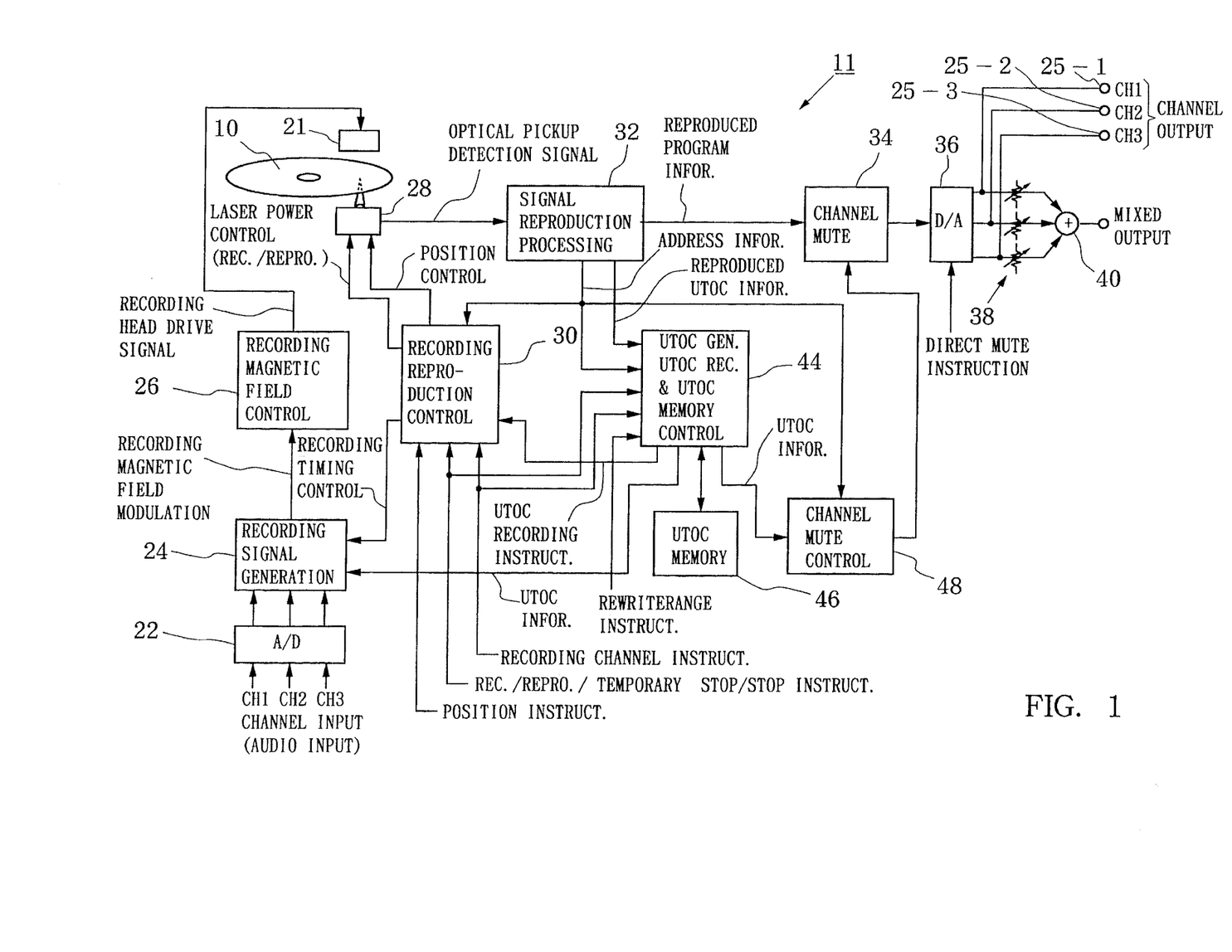
FIG. 1 is a control block diagram of an optical magnetic disk system in accordance with an embodiment of the present invention.

FIG. 1 is a block diagram illustrating the control according to the present invention that is performed by the optical magnetic disk recording/reproducing device 11 of FIG. 9. The input audio signal for each channel CH1 to CH3 is converted into digital representation by the A/D converter 22 and then processed by recording signal generation means 24

(corresponding to the sound compression section 27, memory 31, EFM encoder/decoder 33, system controller 45 etc. of FIG. 9) to generate a recording signal in a predetermined format. By use of the recording signal, recording magnetic field control means 26 (corresponding to the head drive 35 etc. of FIG. 9) modulates the recording magnetic field generated by the recording head 21. During recording, recording/reproduction control means 30 (corresponding to system controller 45 etc. of FIG. 9) controls the optical pickup 28 to irradiate a recording laser light beam of predetermined power, so that information is recorded onto the optical magnetic disk 10.

During reproduction, the recording/reproduction control means 30 controls the optical pickup 28 to irradiate a reproducing laser light beam of predetermined power. Recorded information detection signal output from the optical head 28, as it detects the information recorded on the optical magnetic disk 10 during the reproduction is input to and processed by signal reproduction, processing means 32 (corresponding to the RF amplifier 19, address decoder 37, EFM encoder/decoder 33, memory 31, sound expansion section 39, system controller 45, etc. ). The signal reproduction processing means 32 demodulates this detection signal to reproduce the program information. This program information is fed to channel mute means 34 (corresponding to the sound expansion section 39 of FIG. 9) and the D/A converter 36 to be converted into and out-put as analog signals for the individual channels CH1 to CH3.

From the signal reproduction processing means 32 are output the UTOC and position (address) information, detected by tracing the UTOC and recordable areas, respectively, of the optical disk 10.

The recording/reproduction control means 30 performs control to implement recordation/reproduction on the basis of the recording/reproduction/temporary stop/stop instruction, position instruction, recording channel instruction or the like that is input in response to the user's external operation. That is, when the reproduction and position instructions are given, the recording/reproduction control means 30 uses the laser power as the reproducing laser power, and performs feed control, track-jump control etc. of the optical pickup 28 to search for the instructed position, from which it will reproduce the recorded information.

When the recording and recording channel instructions are given, the recording/reproduction control means 30 uses the laser power as the recording laser power, and performs feed performs recording onto the designated channel by modulating the recording magnetic field of the recording head with the recording signal. At this time, the old recording left on the optical magnetic disk 10 is erased by overwriting The control for recording only onto the designated channel is arranged, for example, as shown in FIG. 8. Because of the fact that channels are sequentially recorded within each address, the control can be realized by detecting the timing of the channel in question on the basis of the change timing of the address signal and recording on the detected timing. Further, the control for initiating recording at a specific position is realized by designating a position at which to start recording, for example, by a position instruction, then setting up a temporary stop state automatically by giving a temporary stop instruction (or by giving a temporary stop instruction at a desired position from the reproduction state) once the designated position is searched out, and then cancelling the temporary stop by giving a recording instruction at desired timing in this state so as to start recording.

In reproduction, UTOC generation/UTOC recording/ UTOC memory control means 44 (corresponding to the memory controller 29, system controller 45 etc. of FIG. 9 ) receives the UTOC information read out from the UTOC area of the optical magnetic disk 10 at the beginning of the reproduction operation and store the UTOC information into a UTOC memory 46 (provided in an area of the memory 31 of FIG. 9). Further, during recording of the program information, the recording reproduction control means 30 receives the position information generated when the recording start is instructed, the position information and recording channel instruction generated when the recording end instruction is given and rewrite range instruction, modifies the reproduction information, stored in the UTOC memory 46, for the corresponding channel to reform new UTOC information, and thereby renews the contents of the UTOC memory 46. Once the rewrite range instruction is given, the recording/reproduction control means 30 produces UTOC information that designates the actually recorded section as a section to be reproduced and designates the non-recorded section as a section to be muted.

Once the recording of the program information onto the optical magnetic disk 10 and the writing of the UTOC information into the UTOC memory 46 have been completed, the UTOC generation/UTOC recording/UTOC memory control means 44, automatically or in response to an instruction based on the user's external operation, records (overwrites) the UTOC information contained in the UTOC memory 46 onto the UTOC area of the optical magnetic disk 10.

During reproduction, channel mute control means 48 (corresponding to the system controller 45 of FIG. 9) receives position detection information reproduced from the optical magnetic disk 10 and controls the channel mute means 34 for each channel CH1–CH3 on the basis of each channel's reproduction information stored in the UTOC memory 46. Namely, at each timing dictated by the position detection information, the channel mute control means 48 reads out from the UTOC memory 46 each channel's reproduction information, so as to cancel the muting state of each position of each channel which corresponds to a position indicated by the reproduction information as a position to be reproduced and mute each position of each channel which corresponds to a position indicated by the reproduction information as a positive to be silenced.

Figure 10:
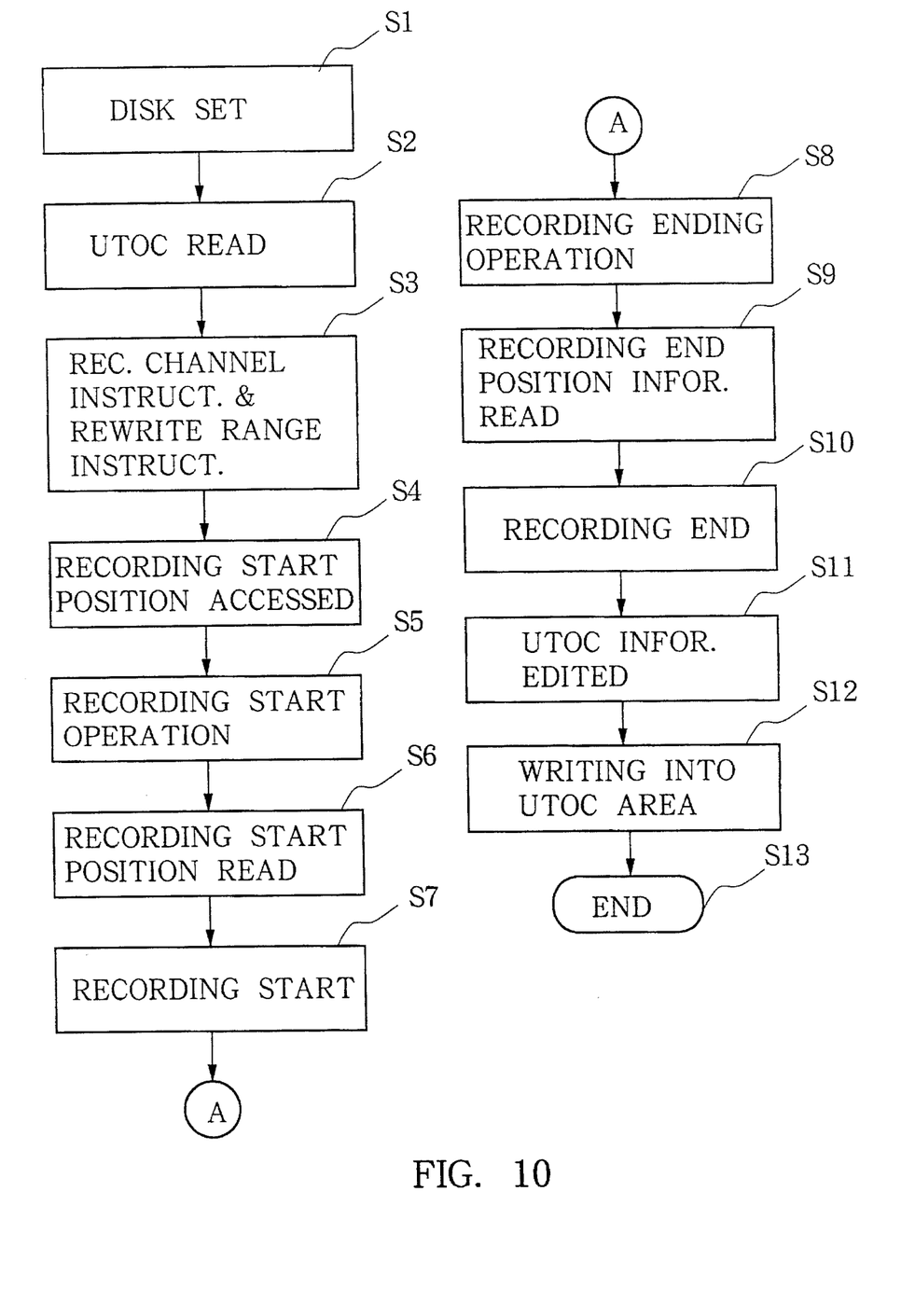
FIG. 10 is a flowchart illustrating an example of a control flow followed in the overwrite operation in the embodiment of FIG. 1.

In FIG. 10, there is shown an example of a control flow followed in the overwrite operation of the optical magnetic disk recording/reproducing device shown in FIG. 1. Once the optical magnetic disk 10 is set in the recording/reproducing device (step S1), the UTOC information is read out from the UTOC area of the disk 10 and stored into the UTOC memory 46 (step S2). After that, in order to execute new recording, a recording channel and a rewrite range are designated in response to external operations (step 3), a specific recording start position is called up in response to external operations (reproduction, fast-forwarding, searching operations etc.) (step S4), and then predetermined recording start operations are performed (step S5), upon which the position information read out from the recording starting position of the optical magnetic disk 10 is stored as recording start position information in temporary storage areas of the UTOC memory 46, etc. (step S6). Thus, from that position, recording (overwriting) of audio signal onto the designated channel is initiated (step S7).

Thereafter, once recording end operations are performed at desired timing (step S8), the position information being read out from the optical magnetic disk 10 at that time is stored as recording end position information in temporary storage areas of the UTOC memory 46, etc. (step S9), and thus the recording process comes to an end (step S10).

Upon termination of the recording operations, the UTOC generation/UTOC recording/UTOC memory control means 44, automatically or in response to an instruction resultant from external operations and on the basis of the temporarily-stored recording start position information, recording end position information, recording channel information and rewrite range designating information, rewrites the corresponding information of the UTOC information stored in the UTOC memory 46 (step S11). That is, with respect to the designated range of the designated channel, UTOC information is edited so as to designate the actually-recorded section (section indicated by the recording start position information and recording end position information) as a section to be reproduced and designate the non-recorded section as a section to be muted. Then, upon termination of the UTOC information editing, the edited UTOC information is overwritten into the UTOC area of the optical magnetic disk 10 (step S12), and thus all the necessary recording operations are completed (step S13).

Figure 11A:
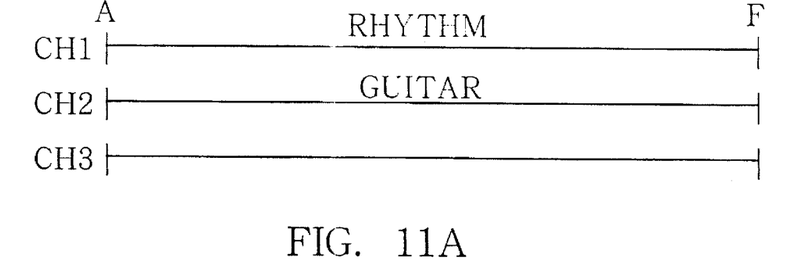
FIG. 11 shows an example of the overwrite operation performed in accordance with the control flow of FIG. 10.

An example of the actual recording process of FIG. 10 will be explained below with reference to FIG. 11. First, as shown in FIG. 11A, channels CH1 and CH2 are indicated as recording channels, and rhythm and guitar sounds are recorded onto channels CH1 and CH2, respectively. If the optical magnetic disk 10 is entirely a "blank" disk which has no previous recording thereon, then just silence is reproduced, as the non-recorded section is reproduced, and thus it is not necessary to designate any rewrite range. In the absence of the rewrite range designation, the reproduction information of the UTOC information is generated to designate the entire section or actually recorded section A–F of the program area as section to be reproduced and designate the sections other than the recorded section as sections to be muted. If the optical magnetic disk 10 has previous recording on which overwriting is to be performed with respect to section A–F, and the other sections are treated as sections to be reproduced, the overwrite operations are executed by designating the section A–F as the rewrite range. By so doing, the recording on the sections than the section other A–F can be prevented from being treated as sections to be muted.

Figure 11B:
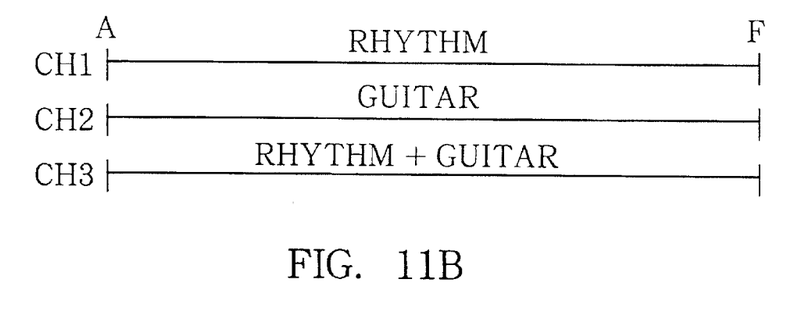
Figure 11C:
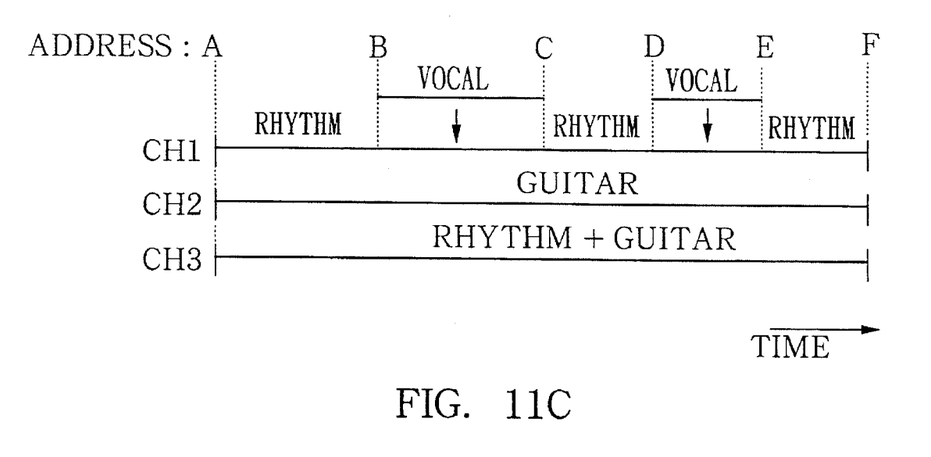

Once the recording onto channels CH1 and CH2 have been completed, the recorded information of channels CH1 and CH2 is reproduced and mixed together onto channel CH3 as shown in FIG. 11B. Because channels CH1 and CH2 are now no longer necessary, vocal information appearing only partially is overwritten onto one of the channels (for example, channel CH1 in the illustrated example) as shown in FIG. 11C. This overwriting sequence is described below.

First, channel CH1 is designated as a channel to be used for overwriting, and section A–F is designated as a rewrite range. Namely, the start address is designated as a position to start muting, while the end, address is designated as a position to stop muting. Then, while monitoring channel CH3, the vocal information is over-written onto the necessary sections (addresses B–C and D–E) which may be detected, for example, by searching. Upon completion of the recording operation, the UTOC information is edited again in such a manner that sections B–C and D–E of the rewrite range A–F of channel CH1 are processed as sections to be reproduced and sections A–B, C–D and E–F are processed as sections to be muted, and the re-edited UTOC information is overwritten onto the UTOC area of the optical magnetic disk 10.

Figure 12:
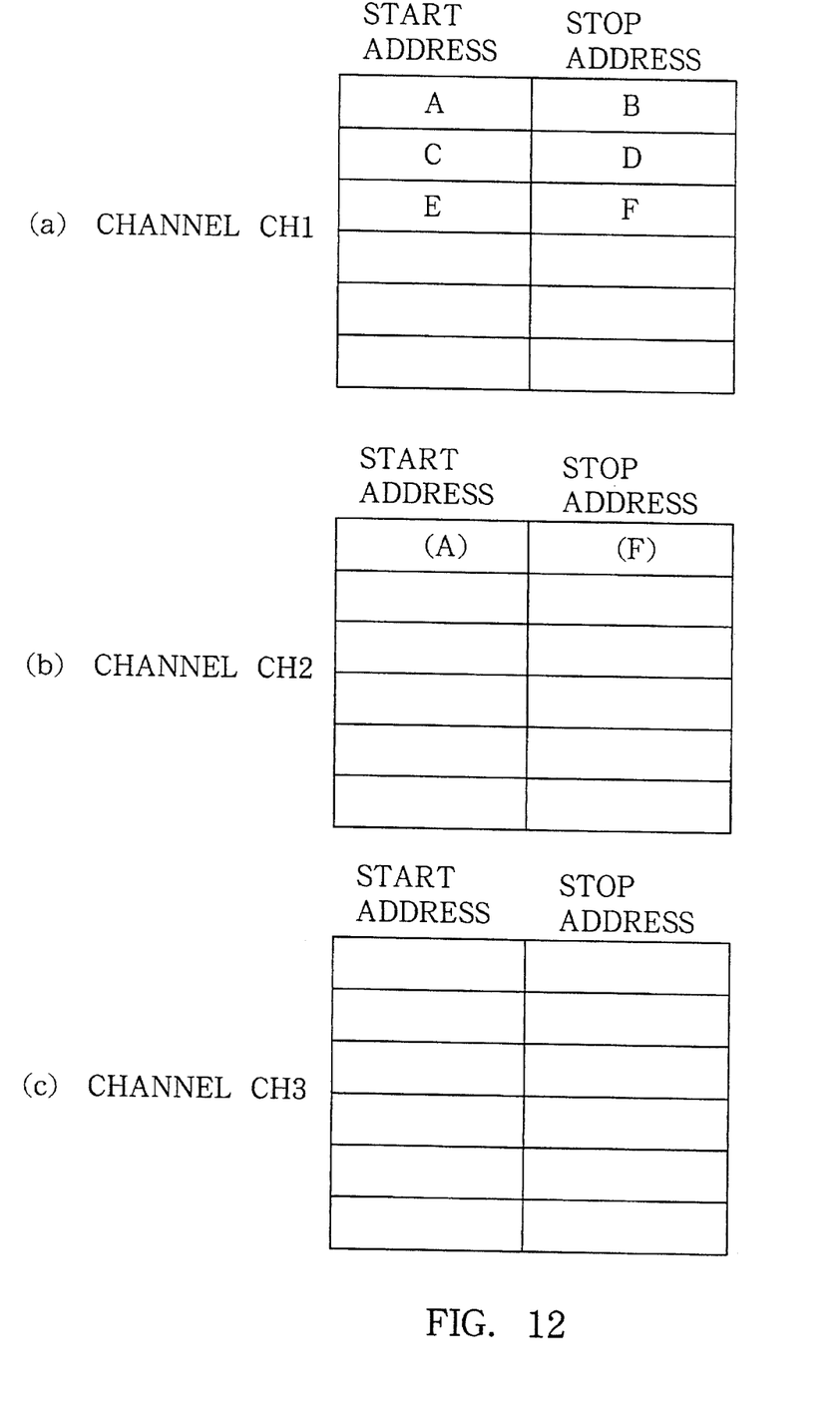
FIG. 12 is a diagram showing UTOC information ultimately produced by the overwrite operation of FIG. 11.

FIG. 12 shows examples of reproduction information contained in the re-edited UTOC information, where the reproduction information is composed solely of the information representing each position to be muted. In the case of channel CH2, positions to be muted need not necessarily be written in the UTOC in some applications, if information indicating that channel CH2 should be erased throughout the length corresponding to one music piece (section A–F) is recorded on the UTOC area, or if there are output ON/OFF switches to generate a direct mute instruction for each of channels CH1 to CH3. In the latter case, it sufficient to turn off the output-ON OFF switch for channel CH2. Further, recording of the UTOC information onto the UTOC area, although has been described in the above example as being automatically executed upon completion of the sound recording, may be executed in response to an instruction based on the user's manual operation.

Furthermore, although the recording start and stop positions have automatically been treated as mute-off and mute-on positions, respectively, in the above-described embodiment, the mute-ON and mute-OFF positions may be determined either automatically or manually as necessary, in the case where delicate timing is to be achieved. For example, to determine the mute-ON and mute-OFF positions manually, after overwriting operation, a predetermined entry switch is depressed upon arrival at a desired mute-ON or mute-OFF position while reproducing and monitoring previously recorded and newly recorded sections of the channel in question. Application of this manual approach can effectively remove or mute noise generated during recording. Further, in the case of the manual approach, an instruction to write UTOC information is given manually or automatically after the entry of the positions.

When reproducing the thus-recorded information from the optical magnetic disk 10, the reproducing and muting conditions are controlled for each channel on the basis of the final UTOC information left on the UTOC memory 46 (or, on the basis of the UTOC information read out from the UTOC area of the disk 10 when the disk 10 was first set in the device in the case where the disk 10 is once removed from the device and then set in the device again). Namely, if the reproduction information contained in the UTOC information is as shown in FIG. 12, the sections A to F are controlled as follows:

| Section | Channel CH1 | Channel CH2 | Channel CH3 |
| --- | --- | --- | --- |
| A–B | Muted | Muted | Reproduced |
| B–C | Reproduced | Muted | Reproduced |
| C–D | Muted | Muted | Reproduced |
| D–E | Reproduced | Muted | Reproduced |
| E–F | Muted | Muted | Reproduced |

Because the sections to be muted are not merely skipped during reproduction but silent sound is output for these sections as mentioned above, time continuity of a music piece can be maintained.

Modifications

The prior art technique to manage reproduction and erasure in terms of track numbers, such as in MD recorders, may be combined with the novel functions of the present invention. In such a case, however, information of each track number to be erased is skipped during reproduction (namely, time continuity is lost).

The above embodiment has been described as performing overwrite-recording of the program information by detecting the time-divisional timing of a designated channel and recording only on that channel. Alternatively, the program information overwriting may be achieved by, for each rotation, reading the program information of all channels with respect to each section to be overwritten, re-arranging the program information of the designated channel by means of electric circuitry and newly overwriting the re-arranged information.

Further, although the embodiment has been described above in relation to the case where position information is previously recorded on the recording medium, the information indicating positions to be reproduced and muted may be generated on the basis of position information generated in the device.

Further, although the present invention has been described above as applied to the case where only an optical magnetic disk is used as a recording medium, the present invention is also applicable to systems which employ various other recording media, such as a rewritable type optical disk, multi-track magnetic tape, and helical scan type magnetic tape and disk. In the case of the magnetic tape, the reproduction information may be recorded on a UTOC area provided in the leading position of the tape. Further, in the case of the magnetic disk, the reproduction information may be recorded in the directory area or the like.

What is claimed is:

1. A recording device comprising:

recording means for recording program information of plural channels onto a recording medium in such a manner that said program information of the plural channels can be simultaneously reproduced from said recording medium; and reproduction information generation means for, with respect to said program information recorded on said recording medium, generating reproduction information, wherein the reproduction information comprises either information that indicates each position of the program information to be reproduced, or information that indicates each position of the program information to be silenced, or both.

2. A recording device comprising:

recording means for recording program information of plural channels onto a recording medium in such a manner that the program information of the plural channels can be simultaneously reproduced from the recording medium; and reproduction information generation means for, with respect to the program information recorded on the recording medium, generating reproduction information, wherein the reproduction information comprises either information that indicates each position of the program information to be reproduced, or information that indicates each position of the program information to be silenced, or both, wherein the reproduction information generation means identifies a specific section of the program information designated by information that indicates recording start and recording end positions, the information that indicates recording start and recording end positions being identified when new recording is performed with respect to any of the plural channels, wherein the reproduction information generation means generates the reproduction information designating each position of the specific section as positions to be reproduced for each of the plural channels, and wherein the reproduction information generation means identifies a section other than the specific section and generates the reproduction information designating each position of the section other than the specific section as positions to be silenced.

3. A recording device comprising:

recording means for recording program information of plural channels onto a recording medium in such a manner that the program information of the plural channels can be simultaneously reproduced from the recording medium;

reproduction information generation means for, with respect to the program information recorded on the recording medium, generating reproduction information, wherein the reproduction information comprises either information that indicates each position of the program information to be reproduced, or information that indicates each position of the program information to be silenced, or both; and reproduction information recording control means for recording, onto a predetermined position of said recording medium, reproduction information that are generated by the reproduction information generation means.

4. A reproducing device comprising:

program reproduction control means for simultaneously reproducing program information of plural channels recorded on a recording medium; and reproduction information storage means for storing reproduction information, wherein the reproduction information comprises either information that indicates each position of the program information to be reproduced, or information that indicates each position of the program information to be silenced, or both, for each of the plural channels of said recording medium, wherein said program reproduction control means performs control to reproduce or silence said program information for each of the plural channels, on the basis of the reproduction information stored in said reproduction information storage means.

5. A reproducing device as defined in claim 4, wherein said reproduction information is read out from a predetermined position of said reproduction information storage means.

6. A recording medium which has program information of plural channels recorded thereon in such a manner that said program information of plural channels can be simultaneously reproduced therefrom, and wherein either information that indicates each position of the program information of each of the plural channels to be reproduced, or information that indicates each position of the program information of each of the plural channels to be silenced, or both is recorded on a predetermined recording position of said recording medium.

7. A recording device as defined in claim 1, wherein the reproduction information is stored in an user's table of contents (UTOC) area of recording medium.

8. A reproducing device as defined in claim 4, wherein the reproduction information is stored in an user's table of contents (UTOC) area of recording medium.

9. A recording medium as defined in claim 6, wherein the predetermined recording position comprises an user's table of contents (UTOC) of the recording medium.

10. A recording device comprising:

a recording circuit that records program information of plural channels onto a recording medium in such a manner that the program information of the plural channels can be simultaneously reproduced from the recording medium; and a reproduction information generation circuit that, with respect to the program information recorded on the recording medium, generates reproduction information, wherein the reproduction information comprises either information that indicates each position of the program information to be reproduced, or information that indicates each position of the program information to be silenced, or both.

11. A recording device comprising:

a recording circuit that records program information of plural channels onto a recording medium in such a manner that the program information of the plural channels can be simultaneously reproduced from the recording medium; and a reproduction information generation circuit that, with respect to the program information recorded on the recording medium, generates reproduction information, wherein the reproduction information comprises either information that indicates each position of the program information to be reproduced, or information that indicates each position of the program information to be silenced, or both, wherein the reproduction information generation circuit identifies a specific section of the program information designated by information that indicates recording start and recording end positions, the information that indicates recording start and recording end positions being identified when new recording is performed with respect to any of the plural channels, wherein the reproduction information generation circuit generates the reproduction information designating each position of the specific section as positions to be reproduced for each of the plural channels, wherein the reproduction information generation circuit identifies a section other than the specific section and generates the reproduction information designating each position of the section other than the specific section as positions to be silenced.

12. A recording device comprising:

a recording circuit that records program information of plural channels onto a recording medium in such a manner that the program information of the plural channels can be simultaneously reproduced from the recording medium;

a reproduction information generation circuit that, with respect to the program information recorded on the recording medium, generates reproduction information, wherein the reproduction information comprises either information that indicates each position of the program information to be reproduced, or information that indicates each position of the program information to be silenced, or both; and a reproduction information recording control circuit that records reproduction information that are generated by the reproduction information generation circuit onto a predetermined position of the recording medium.

13. A reproducing device comprising:

a program reproduction control circuit that simultaneously reproduces program information of plural channels recorded on a recording medium; and a reproduction information storage circuit that stores reproduction information for each of the plural channels of the recording medium, wherein the reproduction information comprises either information that indicates each position of the program information to be reproduced, or information that indicates each position of the program information to be silenced, or both, wherein the program reproduction control circuit performs control to reproduce or silence the program information for each of the plural channels on the basis of the reproduction information stored in the reproduction information storage circuit.

14. A reproducing device as defined in claim 13, wherein the reproduction information is read out from a predetermined position of the reproduction information storage circuit.

15. A recording device as defined in claim 10, wherein the reproduction information is stored in an user's table of contents (UTOC) area of the recording medium.

16. A reproducing device as defined in claim 13, wherein the reproduction information is stored in an user's table of contents (UTOC) area of the recording medium.

17. A recording method comprising the steps of:

recording program information of plural channels onto a recording medium in such a manner that the program information of the plural channels can be simultaneously reproduced from the recording medium; and generating reproduction information, wherein the reproduction information comprises either information that indicates each position of the program information to be reproduced, or information that indicates each position of the program information to be silenced, or both, with respect to the program information recorded on the recording medium.

18. A recording method comprising the steps of:

recording program information of plural channels onto a recording medium in such a manner that the program information of the plural channels can be simultaneously reproduced from the recording medium;

generating reproduction information with respect to the program information recorded on the recording medium, wherein the reproduction information comprises either information that indicates each position of the program information to be reproduced, or information that indicates each position of the program information to be silenced, or both;

identifying a specific section designated by information that indicates recording start and recording end positions, the information that indicates recording start and recording end positions being detected when new recording is performed with respect to any of the plural channels;

generating the reproduction information designating each position of the specific section as positions to be reproduced for each of the plural channels; and identifying a section other than the specific section and generating the reproduction information designating each position of the section other than the specific section as positions to be silenced.

19. A recording method comprising the steps of:

recording program information of plural channels onto a recording medium in such a manner that the program information of the plural channels can be simultaneously reproduced from the recording medium;

generating reproduction information with respect to the program information recorded on the recording medium, wherein the reproduction information comprises either information that indicates each position of the program information to be reproduced, or information that indicates each position of the program information to be silenced, or both; and recording reproduction information onto a predetermined position of the recording medium.

20. A reproducing method comprising the steps of:

simultaneously reproducing program information of plural channels recorded on a recording medium;

storing reproduction information for each of the plural channels of the recording medium, wherein the reproduction information comprises either information that indicates each position of the program information to be reproduced, or information that indicates each position of the program information to be silenced, or both; and performing control to reproduce or silence the program information for each of the plural channels on the basis of the reproduction information stored.

21. A reproducing method as defined in claim 20 further comprising the steps of:

storing the reproduction information in a predetermined position of the recording medium; and reading the reproduction information from the predetermined position.

22. A recording method as defined in claim 17 further comprising the steps of storing the reproduction information in an user's table of contents (UTOC) area of the recording medium.

23. A reproducing method as defined in claim 20 further comprising the steps of storing the reproduction information in an user's table of contents (UTOC) area of the recording medium.

* * * * *